United States Patent [19]
Evans et al.

[11] Patent Number: 5,034,589
[45] Date of Patent: Jul. 23, 1991

[54] ELECTRICAL DISCHARGE APPARATUS FOR PRODUCING A TEXTURED FINISH ON A CONDUCTIVE SURFACE

[75] Inventors: Gareth A. Evans, Sheffield; David H. Savidge, Rotherham; Geoffrey Wilson, Chesterfield, all of England

[73] Assignee: Sarclad International Limited, Chesterfield, England

[21] Appl. No.: 200,693

[22] Filed: May 31, 1988

[30] Foreign Application Priority Data

May 30, 1987 [GB] United Kingdom ................. 8712753

[51] Int. Cl.$^5$ .............................................. B23P 1/14
[52] U.S. Cl. .............................. 219/69.17; 219/69.14; 219/69.15
[58] Field of Search ................ 219/69 R, 69 E, 69 D, 219/69 G, 69 M, 69 V

[56] References Cited

U.S. PATENT DOCUMENTS

| | | | |
|---|---|---|---|
| 2,783,411 | 2/1957 | Matulaitis | 314/69.17 |
| 3,509,305 | 4/1970 | Bertolasi | 219/69.17 |
| 3,590,204 | 6/1971 | O'Connor | 219/69 E |
| 3,655,936 | 4/1972 | Saito et al. | 219/69.17 |
| 3,668,361 | 6/1972 | O'Connor | 219/69.17 |
| 3,740,519 | 6/1973 | O'Connor | 219/69 E |
| 3,843,864 | 10/1974 | Wohlabaugh | 219/69.15 |
| 4,221,952 | 9/1980 | Sato et al. | 219/69.14 |
| 4,233,485 | 11/1980 | Sato et al. | 219/69.17 |
| 4,287,403 | 9/1981 | Sato et al. | 219/69.17 |
| 4,443,682 | 4/1984 | Ho | 219/69.17 |
| 4,471,199 | 9/1984 | Michishita et al. | 219/69 E |
| 4,683,364 | 7/1987 | Anderson | 219/69 G |
| 4,728,764 | 3/1988 | Matsumoto et al. | 219/69.16 |
| 4,749,838 | 6/1988 | Lodetti et al. | 219/69 D |
| 4,950,860 | 8/1990 | El-Menshawy | 219/69.18 |

FOREIGN PATENT DOCUMENTS

| | | |
|---|---|---|
| 0076149 | 4/1983 | European Pat. Off. . |
| 0076150 | 4/1983 | European Pat. Off. . |
| 2540408 | 3/1977 | Fed. Rep. of Germany .... 219/69 E |
| 3419629 | 11/1985 | Fed. Rep. of Germany ... 219/69 D |
| 1110318 | 10/1955 | France . |
| 1060653 | 3/1967 | United Kingdom . |
| 1293576 | 10/1972 | United Kingdom . |
| 2024077 | 1/1980 | United Kingdom .............. 219/69 E |
| 2005582B | 11/1982 | United Kingdom . |
| 2007574B | 11/1982 | United Kingdom . |
| 2024078B | 11/1982 | United Kingdom . |
| 2006660B | 1/1983 | United Kingdom . |
| 2001892B | 11/1986 | United Kingdom . |

*Primary Examiner*—M. H. Paschall
*Attorney, Agent, or Firm*—Kinney & Lange

[57] ABSTRACT

Electrical discharge apparatus for producing on the surface of an electrically conductive workpiece a textured or matt finish comprises a plurality of electrodes each connectable to an electrical power source and each carried by a head which in use of the apparatus can be moved linearly of the workpiece with the electrodes each spaced at a predetermined distance from the workpiece surface. A characteristics of the voltage conditions present within the gap existing between the electrodes and the workpiece surface is monitored and, the head is moved towards and away from the workpiece surface to maintain the monitored characteristic within predetermined limits. Dielectric fluid is retained within the gap existing between the electrodes and the workpiece surface, and a series of discrete electrical discharges is promoted between each electrode and the adjacent workpiece surface to cause particles to be removed from the workpiece surface and produce a textured or matt finish thereto.

14 Claims, 3 Drawing Sheets

ELECTRICAL DISCHARGE APPARATUS FOR PRODUCING A TEXTURED FINISH ON A CONDUCTIVE SURFACE

FIELD OF THE INVENTION

This invention relates to a method of and apparatus for applying a textured or matt finish to a surface of a workpiece by an electrical discharge technique. More especially the invention concerns a method of and apparatus for applying a textured or matt finish to the surface of a work-roll used in the rolling of flat metallic products such as steel sheet and strip to produce on the rolled products a complementary textured or matt finish.

DESCRIPTION OF THE PRIOR ART

Hitherto, the work surfaces of mill rolls have been textured by, for example, shot blasting techniques in which steel shot is directed onto the roll surface at high velocity to create at the surface a multiplicity of pits and craters. A complementary textured or matt surface is reproduced on flat products worked by the rolls thereby enhancing the lubrication and paint adherence properties of the products. Texturing is also used to produce an aesthetically appealing surface finish to certain products.

Shot blasting techniques are subject to several disadvantages and limitations. Thus, the ability to produce on a work surface or mill roll a textured or matt finish is dependent upon the hardness of the roll; many rolls having relatively hard surfaces such as hardened steel, tungsten carbide, stellite and the like cannot effectively be textured by a shot blasting technique. Further, shot blasting is inherently a random and uncontrollable process by which only relatively coarse surface finishes can be achieved, that is to say a surface roughness approximating to 2 to 5 micro meters and a peak count of 100 peaks per inch.

Electro-discharge machining apparatus is known for machining the surface of workpieces by passing pulses of electric current from one or more electrodes to the workpiece surface thereby to create pits in the workpiece surface. By this method, depressions and openings can be formed in the workpiece surface. Examples of such apparatus can be found in GB 1293576; GB 1060653; EP-A-76149; EP-B-76150; GB 2001892B; GB 2005582B; GB 2006660B; GB 2007574B; GB 2024077B; and U.S. Pat. No. 3,740,519.

All of the apparatus described in these documents suffer from certain disadvantages which preclude the production of a commercially acceptable textured surface finish.

SUMMARY OF THE INVENTION

The present invention sets out to provide a method of and apparatus for producing a textured or matt surface which does not suffer from, or at least alleviates, the disadvantages referred to above.

According to the present invention in one aspect there is provided electrical discharge apparatus for producing on the surface of an electrically conductive workpiece a textured or matt finish, the apparatus comprising a plurality of electrodes each connectable to an electrical power source and each carried by a head which in use of the apparatus can be moved linearly of the workpiece with the electrodes each spaced at a predetermined distance from the workpiece surface, means for monitoring a characteristics of the voltage conditions present within the gap existing between the electrodes and the workpiece surface, means for moving the head towards and away from the workpiece surface to maintain the monitored characteristic within predetermined limits, means for retaining dielectric fluid within the gap existing between the electrodes and the workpiece surface, and means for promoting a series of discrete electrical discharges between each electrode and the adjacent workpiece surface thereby to remove particles from the workpiece surface and produce a textured or matt finish thereto.

The workpiece may comprise a work roll, means being provided to impart rotation to the work roll as the electrode head is moved linearly with respect thereto.

In a preferred arrangement, the electrodes are arranged in a uniform pattern, adjacent electrodes being equi-distant from one another. The head is preferably moved automatically towards and away from the workpiece surface by a servo-system to control the gap between each electrode and the workpiece surface in response to changes in the monitored characteristic of the voltage conditions.

The servo-system preferably operates automatically in response to changes in the monitored characteristic of the voltage conditions extant between a selected one of the several electrodes and the workpiece surface during the normal spark discharge period of the selected electrode.

The power source is preferably a pulsed DC power source.

In a preferred arrangement, the electrodes are submerged in a common bath of dielectric fluid contained with a gaiter, one side of which is closed by its abuttment with the workpiece surface. The gaiter may be open-topped or fully enclosed. Dielectric liquid may continuously or periodically be added to the bath contained within the gaiter, the liquid being allowed to overflow from one or more walls of the gaiter thereby to ensure a continuous flow of dielectric fluid to and from the bath.

The dielectric liquid may be conveyed to the gaiter through a bore extending longitudinally through each electrode. Dielectric fluid may be caused to flow through the bore of each electrode by a positive pressure applied to fluid entering the electrode bore end remote from the workpiece or by a negative pressure applied to fluid leaving the bore of the or each electrode.

In an alternative arrangement, dielectric fluid is conveyed to the gaiter through one or more nozzles positioned between two or more electrodes.

Means may be provided to reduce the insulating characteristics of the dielectric fluid. In one embodiment, the dielectric fluid may be preheated prior to admission to the gaiter.

The particle removing electrical discharges may be over-voltage initiated.

A plurality of electrode heads may be provided, each equipped with electrical contact blocks to connect in a selected manner with the power source; thus, the number and pattern of electrodes employed at any given time can readily be changed.

According to the present invention in another aspect, there is provided electrical discharge apparatus for use with electrically conductive workpieces, the apparatus comprising a plurality of electrodes each insulated electrically from the others and each carried by a head capable of being driven linearly with respect to the workpiece with the electrodes spaced from the workpiece surface, a container for dielectric fluid into one side of which the several electrodes protrude and another side of which is closed by a surface of the workpiece against which, in use, the container abuts, means for conveying dielectric fluid to and from the container and for maintaining a predetermined level therein, and means for promoting a series of discrete electrical discharges through the dielectric fluid and between each electrode and the adjacent surface of the workpiece.

Dielectric fluid may be conveyed to the container through bores extending longitudinally of one or more of the electrodes or through nozzles positioned between individual electrodes. Dielectric fluid may leave the container over a weir to maintain the fluid level therein. The weir may be defined by the upper rim of one or more of the container walls.

BRIEF DESCRIPTION OF THE DRAWINGS

The invention will now be described by way of example only with reference to the accompanying diagrammatic drawings in which.

DESCRIPTION OF THE PREFERRED EMBODIMENT OF THE INVENTION

Figure 1:
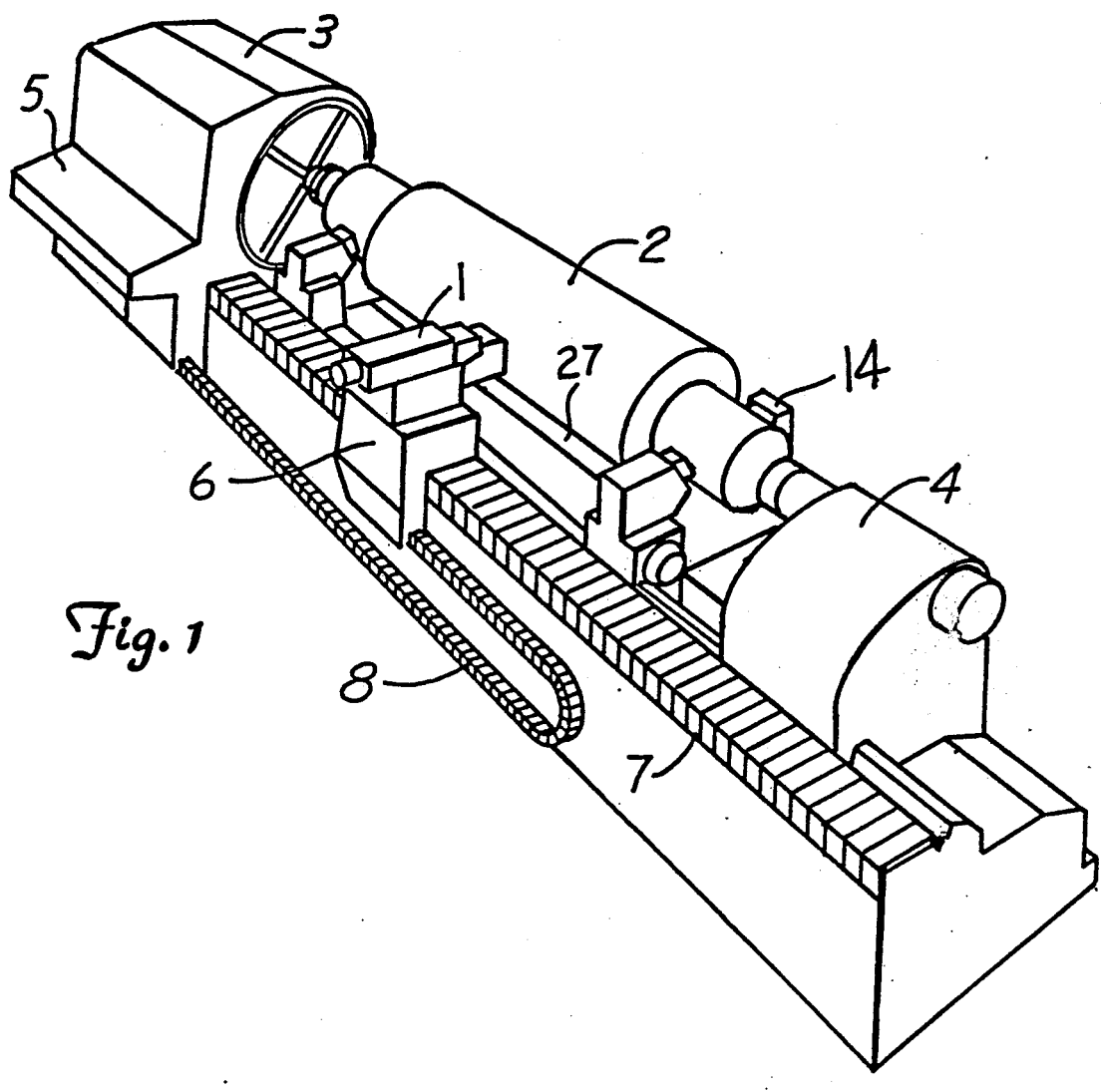
FIG. 1 is a perspective view which diagrammatically illustrates electrical discharge apparatus in accordance with the invention mounted adjacently work surface of a mill roll.
Figure 2:
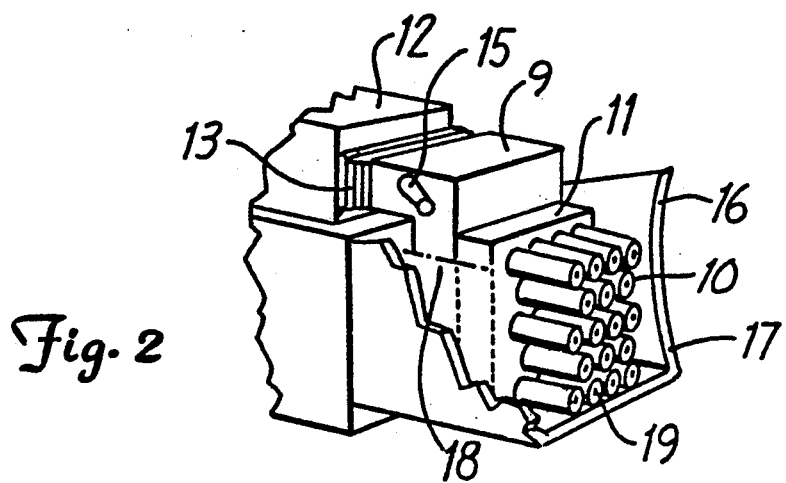
FIG. 2 is a side elevational perspective view to an enlarged scale of a dielectric container which forms part of the electrical discharge apparatus illustrated in FIG. 1 with one side wall of the container partly removed for ease of reference.

In FIGS. 1 and 2 of the drawings, electrical discharge apparatus 1 in accordance with the invention is shown positioned adjacent the work surface of a mill roll 2. The mill roll 2 is mounted horizontally for rotation about its longitudinal axis between headstock 3 driven by an electric motor (not shown) over a controlled range of speeds and an idler tailstock 4 of a lathe-type machine.

The electrical discharge apparatus 1 is mounted on a carriage 6 driven lengthwise of the mill roll 2 by a second electric motor (not shown) along a track 7 positioned to one side of the roll 2. The carriage is coupled to a control console 5 via a cable housed within an articulated conduit 8.

As will be seen more clearly from FIG. 2, the apparatus 1 includes a head 9 comprising an array of electrodes 10 supported from a block 11 of insulating material such that each individual electrode is insulated electrically from its neighbours. The supported ends of the electrodes 10 may be threaded and engage complimentary threaded bores extending into and through the block 11. Thus, the electrodes can readily be removed from their seatings within the block. Other methods of removably mounting the electrodes with respect to the block can be adopted. The head 9 is movable by a servo motor towards and away from the roll 2 and is supported from a housing 12 in which is located electrical connections for coupling each electrode to an individual source of pulsed direct current and for controlling head movement in dependence upon one or more monitored characteristics of the voltage conditions present within the gap which, in use, exists between the electrode 10 and the surface of the roll 2. The head 9 may be subdivided into separate segments which are driven towards and away from the roll surface by more than one servo motor such that smaller groups of electrodes to that illustrated can be carried by separate heads. A bellows-type seal 13 is provided between the head 9 and housing 12.

Electrical contact between the pulsed DC power supply and the roll 2 is effected by brushes 14 which bear against a portion of the roll neck at one end of the roll. Alternatively a purpose built rotating contact arrangement can be employed.

The head 9 can selectively be removed from its connection to housing 12 by operation of a lever 15 or some other similar guide release system. Thus, several individual heads 9 each having standard electrical connections and each including electrode arrays differing in number and configuration may be provided to accommodate any one of a predetermined number of applications.

The electrodes 10 protrude into a bath of dielectric fluid contained within a gaiter 16 which abuts at its open side against the adjacent roll surface. The leading edge 17 of the gaiter 16 is of a flexible material and is curved in a complementary sense to the radius of the roll to provide a relatively good seal between the gaiter edge 17 and the abutting roll surface. Thus, the electrodes 10 and the adjacent work surface of the roll are totally immersed in a common bath of dielectric fluid. The level of the bath of dielectric fluid is indicated by broken line 18. The choice of dielectric fluid is dependent upon various properties necessary to achieve the required electro-discharge characteristics. Suitable dielectric fluids include paraffin, hydrocarbon fluids, and deionised water. The dielectric fluid may be subjected to temperature control to promote breakdown of its insulating properties. Alternatively, a heating element may be positioned within the dielectric bath for this purpose.

Dielectric fluid is admitted to the bath via bores 19 extending through the electrodes 10. Alternatively, dielectric fluid is admitted to the bath through nozzles interposed between individual electrodes.

The roll contacting edge of the gaiter 10 may be manufactured from any suitable material, these including plastics and rubber.

Figure 3:
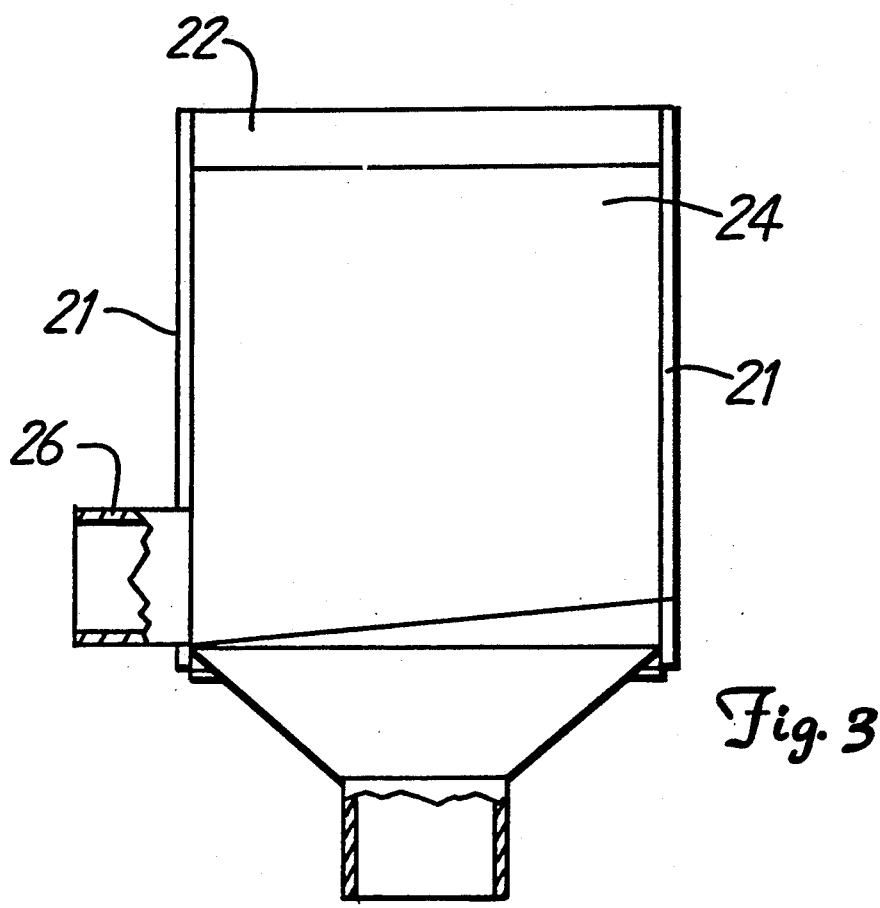
FIGS. 3 to 5 are respectively a front, plan view from above and a side view of a dielectric container in accordance with the invention.
Figure 4:
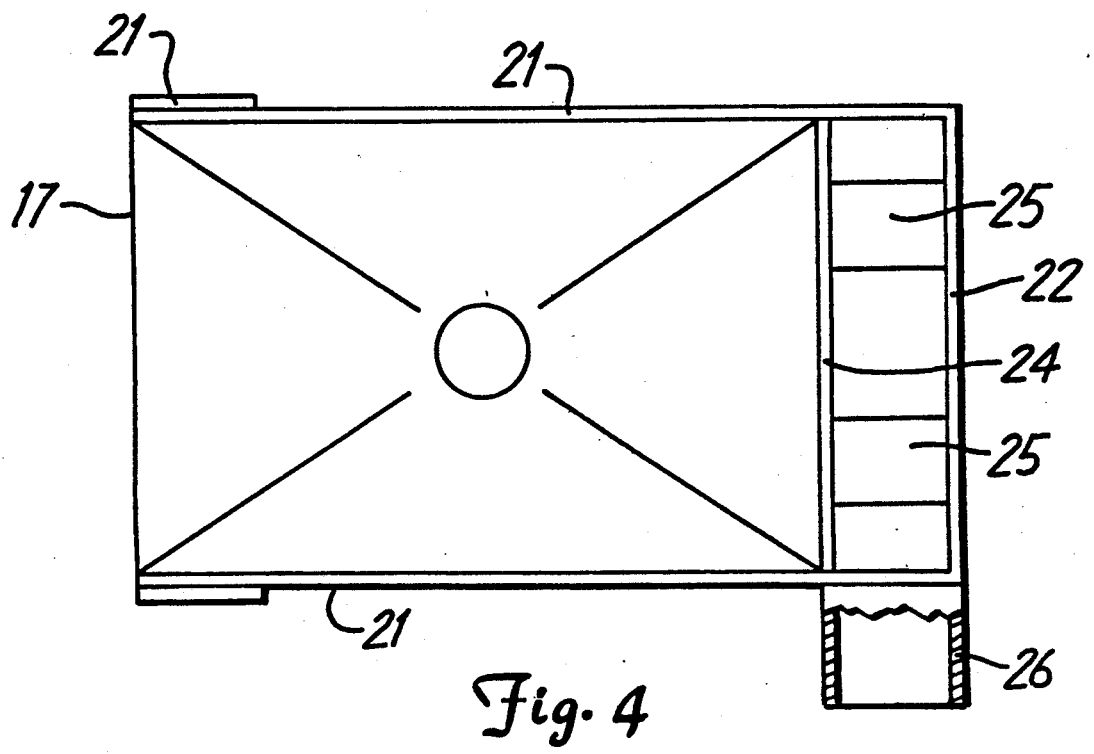
Figure 5:
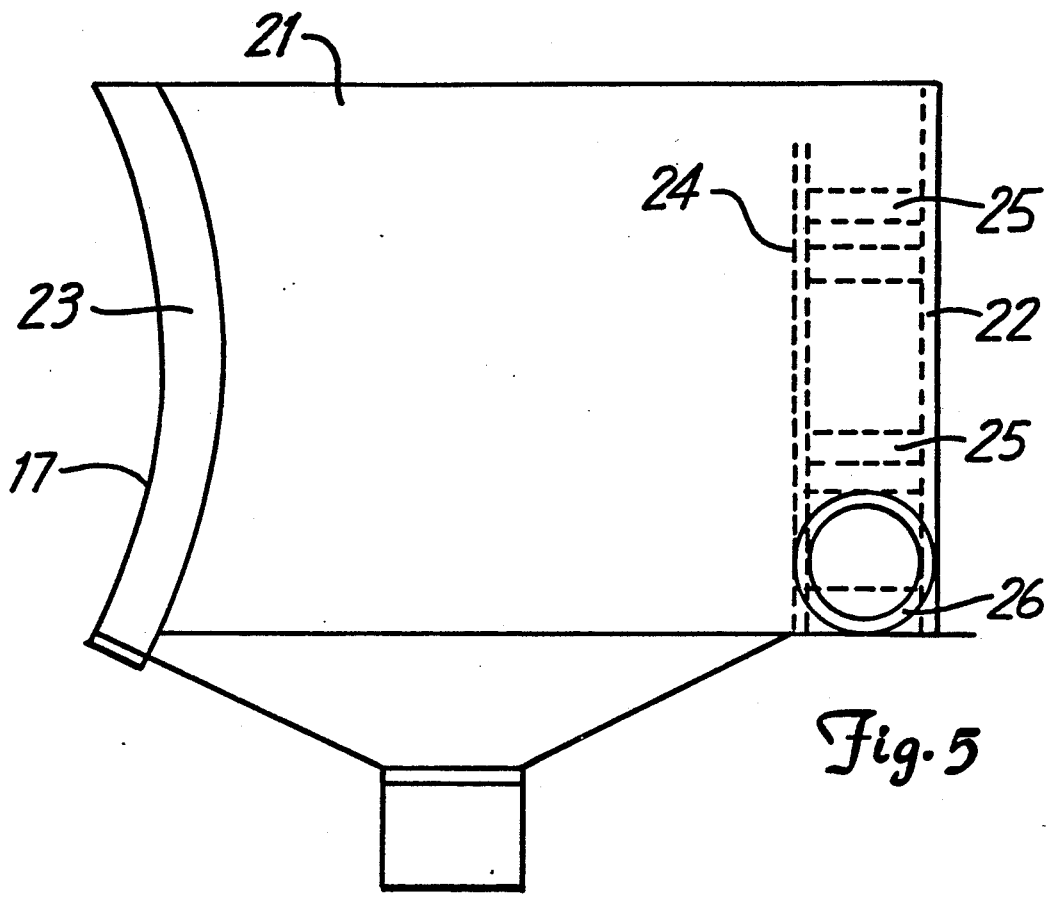

The gaiter is illustrated in greater detail in FIGS. 3 to 5. Referring now to these Figures, the gaiter 10 is open-topped and comprises side walls 21 and a rear wall 22. The lading edge 17 of the gaiter which, in use, abuts the adjoining surface of the roll 2 is bounded by a flexible edge strip 23 for both sealing purposes and for preventing damage to the roll surface. Positioned within the gaiter 10 is a weir wall 24 over the upper rim of which, in use, dielectric fluid flows to maintain a level of dielectric fluid in the gaiter consistent with the height of the wall 24. The wall 24 is secured to the rear wall 22 of the gaiter by a series of spacers 25. Dielectric fluid leaving the gaiter 10 flows via an outlet 26 towards the base of the channel defined between the weir wall 24 and the rear wall 22 and is collected within a tray 27 (see FIG.

1) positioned below and to one side of the roll and returned to the gaiter following cleansing and cooling.

The continuous flow of dielectric fluid ensures that the temperature of the fluid contained within the gaiter is maintained at or close to a preset value and that metal particles removed from the roll surface and other sparking by-products are not retained within the bath. The bath may be agitated ultrasonically in use to remove contaminants from the roll surface.

Figure 6:
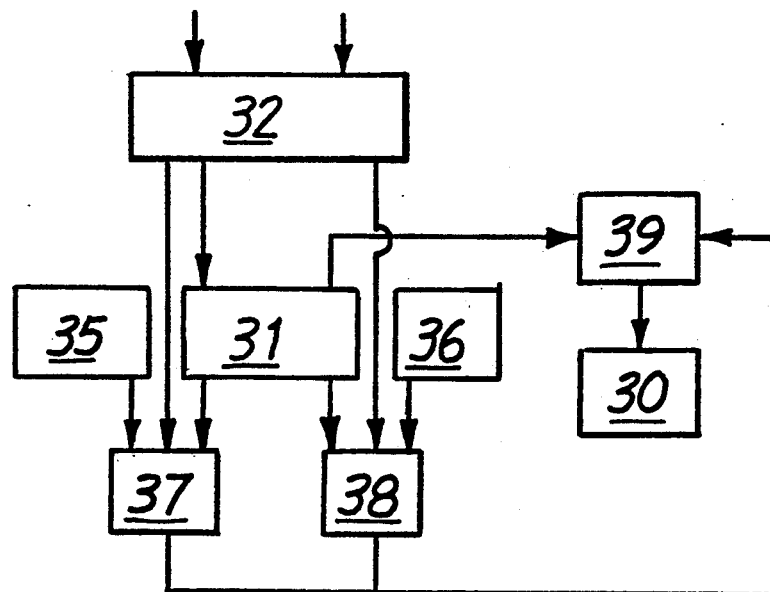
FIG. 6 is a block diagram which diagrammatically illustrates a control system used in association with electrical discharge apparatus in accordance with the invention.

Turning now to FIG. 6, the block diagram illustrates the electrical power supply to the electrodes 10 of the head 9 and the method by which the required gap distance between the electrodes and the roll surface to be textured is monitored and controlled.

In operation of the roll texturing process, it is necessary to ensure that a monitored characteristic of the voltage conditions existing between the electrodes and the roll surface which is responsive to ignition delay is maintained within predetermined limits. If the mean voltage is too high during the sparking period, an open circuit condition exists with insufficient current discharge to generate the sparks necessary to remove material from the roll surface. If the voltage is too low, however, arcing occurs with consequent damage to the roll surface. To achieve the required conditions for sparking and consequently texturing to occur, the mean voltage extant across the gap between the electrodes and the roll must be maintained at a level to achieve an appropriate ignition delay.

Factors which affect the break-down voltage across the gap include the minimum distance between the electrodes and the roll surface; surface roughness; the insulating characteristics of the dielectric fluid; and the level of pollution across the gap.

The texturing process is essentially controlled by monitoring the delay time between the application of a pulse and the initiation of current flow across the gap (a characteristic of the voltage conditions with the gap) and controlling the gap by changing the position of the electrode relative to the roll surface to maintain the monitored delay time within predetermined values to achieve the required sparking condition. Other characteristics of the voltage conditions can be employed.

As shown in FIG. 6, the gap between the electrodes 10 (only one of which is illustrated in FIG. 6 for ease of reference) and the adjacent surface of the roll 2 is controlled via one or more servo control units 30 (only one of which is shown). A system clock generator 31 generates electrical pulses, the pulse width and pulse interval of which are selected by an operator via a controller 32.

The DC power supplies to the electrodes are indicated by reference numerals 35 and 36 and power switching units are illustrated at 37 and 38.

When voltage is first applied, an open circuit condition subsists and no current flows. The servo control unit 30 then operates to drive the electrodes 10 towards the roll surface thereby reducing the distance therebetween. As the gap reduces typically to 0.025 mm the break-down voltage of the dielectric fluid is reached and sparks flow between the electrodes 10 and the roll surface 2. Due to these repetitive discharges, the surface temperature of the roll rises rapidly and small areas on the roll surface melt to produce minute craters on the surface.

As the process continues, the electrodes are themselves worn away thereby increasing the gap distance. This condition is detected at gap voltage monitor 39 by an increased mean gap voltage and the servo control unit 30 operates to drive the electrodes 10 towards the roll surface 2 until the required sparking voltage level is achieved.

If the electrodes are moved too close to the roll surface, the monitored characteristics of mean gap voltage reduces to a level at which arcing could occur. Consequently, the servo control unit 30 is operated to move the electrodes away from the roll surface.

It will be appreciated that the foregoing is merely examplary of electrical discharge apparatus in accordance with the invention and that modifications can readily be made thereto without departing from the true scope of the invention as set out in the claims appended hereto.

We claim:

1. Electrical discharge apparatus for producing a textured or matt finish on the surface of a longitudinally extending, electrically conductive workpiece, the apparatus comprising a plurality of electrodes each connectable to an electrical power source and each carried by a head, a container for dielectric fluid which extends along a longitudinal segment of the workpiece to engage only a minor portion of the workpiece surface, and into which the head and the electrodes carried thereby protrude, means for effecting relative longitudinal linear movement between the head, the dielectric container and the workpiece with the electrodes each spaced from the workpiece surface to define a gap therebetween, means for monitoring the delay in time between the instant in time at which an electrical pulse voltage is applied to a selected one of several electrodes and the instant in time at which current flows across the gap, servo-means responsive to the monitored time delay and operable to move the head towards or away from the workpiece surface to maintain the monitored time delay within predetermined limits, and means for applying a series of discrete electrical voltage pulses of predetermined width and duration to each electrode to promote an electric discharge to an adjacent workpiece surface thereby to remove particles from the workpiece surface and produce a textured or matt finish thereto.

2. Apparatus as claimed in claim 1 wherein the workpiece comprises a work roll mounted for rotation relative to the head.

3. Apparatus as claimed in claim 1 wherein the electrodes are arranged in a uniform pattern, with neighbouring electrodes spaced equi-distant from one another.

4. Apparatus as claimed in claim 1 wherein each electrode is connected to an individual power source.

5. Apparatus as claimed in claim 4 wherein the servo-means operates automatically in response to changes in the monitored time delay of pulses discharged between a selected one of the several electrodes and the workpiece surface.

6. Apparatus as claimed in claim 2 wherein electrodes are submerged in a common bath of dielectric fluid contained within the container, the container being defined at one side by the placement of the container in close proximity to the rotating surface of the workpiece, so that the container is closed at that side by the container's abutment with the rotating surface of the workpiece.

7. Apparatus as claimed in claim 6 wherein the container is open-topped.

8. Apparatus as claimed in claim 6 wherein dielectric liquid is continuously or periodically added to the container, and further comprising:

means for flushing the liquid from the container to ensure a continuous flow of dielectric fluid to and from the bath.

9. Apparatus as claimed in claim 8 wherein one or more side walls of the container are formed to permit dielectric liquid to overflow from the container to define a means for flushing liquid from the container to ensure a continuous flow of dielectric fluid to and from the bath.

10. Electrical discharge apparatus for use with a rotatable cylindrical electrically conductive workpiece, the apparatus including a plurality of electrodes each insulated electrically one from another and each carried by a head, the head and dielectric container capable of being moved linearly along a longitudinal extent of the cylindrical workpiece with the electrodes spaced from the workpiece surface, a container for dielectric fluid which extends along a longitudinal segment of the workpiece to engage only a minor portion of the workpiece surface and into one side of which the head and the several electrodes carried thereby protrude and another side of which, in use of the apparatus, is closed by a rotating surface of the workpiece against which the container abuts, means for conveying dielectric fluid to and from the container for maintaining a predetermined level therein, and means for promoting a series of discrete electrical discharges through the dielectric fluid and between the several electrodes and the adjacent surface of the workpiece.

11. Electrical discharge apparatus for use with a rotatable cylindrical longitudinally extending electrically conductive workpiece, the apparatus including a plurality of electrodes insulated electrically one from another and each carried by a head, means for effecting relative longitudinal linear movement between the head, the dielectric container and the workpiece surface with the electrodes spaced from the workpiece surface, the apparatus further including a container for dielectric fluid which extends along a longitudinal segment of the workpiece to engage only a minor portion of the workpiece surface and into one side of which the head and the several electrodes carried thereby protrude and another side of which, in use of the apparatus, is closed by a rotating surface of the workpiece against which the container abuts, means for conveying dielectric fluid to and from the container for maintaining a predetermined level therein, and means for promoting a series of discrete electrical discharges through the dielectric fluid and between the several electrodes and the adjacent surface of the workpiece.

12. Apparatus as claimed in claim 11 wherein the workpiece comprises a work roll mounted for rotation relative to the head.

13. Apparatus as claimed in claim 11 wherein the container includes an upstanding weir wall which divides the container to front and rear chambers, means for introducing dielectric fluid into one of said chambers and for removing dielectric fluid from the other of said chambers, the arrange being such that is use, dielectric fluid overflows the weir wall thereby to insure a continuous flow of dielectric fluid to and from the container.

14. Apparatus as claimed in claim 12 wherein the side of the container which in use abuts against the work roll surface is curved in a complimentary sense to the radius of the work roll and is edged with a flexible material to provide a seal between the container edge and the abutting work roll surface.

* * * * *

UNITED STATES PATENT AND TRADEMARK OFFICE
CERTIFICATE OF CORRECTION

PATENT NO. : 5,034,589

DATED : July 23, 1991

INVENTOR(S) : Gareth A. Evans et al.

It is certified that error appears in the above-identified patent and that said Letters Patent is hereby corrected as shown below:

Col. 8, line 24, delete "is", insert --in--.

Signed and Sealed this

Twenty-second Day of December, 1992

*Attest:*

DOUGLAS B. COMER

*Attesting Officer*   *Acting Commissioner of Patents and Trademarks*